(12) United States Patent
Vallet et al.

(10) Patent No.: US 12,135,526 B2
(45) Date of Patent: Nov. 5, 2024

(54) HOLOGRAPHIC PROJECTION

(71) Applicant: ENVISICS LTD, Milton Keynes (GB)

(72) Inventors: Louis Vallet, Milton Keynes (GB); Michal Wengierow, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 500 days.

(21) Appl. No.: 17/491,099

(22) Filed: Sep. 30, 2021

(65) Prior Publication Data
US 2022/0107606 A1   Apr. 7, 2022

(30) Foreign Application Priority Data
Oct. 2, 2020   (GB) ..................... 2015652

(51) Int. Cl.
G09G 3/20   (2006.01)
G03H 1/08   (2006.01)
G03H 1/22   (2006.01)

(52) U.S. Cl.
CPC ......... *G03H 1/2294* (2013.01); *G03H 1/0866* (2013.01); *G03H 1/2205* (2013.01); *G09G 3/20* (2013.01); *G03H 2001/2297* (2013.01); *G03H 2222/12* (2013.01); *G03H 2240/51* (2013.01)

(58) Field of Classification Search
CPC .. G03H 1/2294; G03H 1/0866; G03H 1/2205; G03H 2001/2297; G03H 2222/12; G03H 2240/51; G03H 2001/2247; G03H 1/0808; G03H 2001/0212; G03H 2001/0816; G03H 2222/46; G03H 2226/11; G03H 1/22; G03H 1/16; G03H 1/2249; G03H 1/26; G03H 2001/0077; G03H 2001/0224; G03H 2225/00; G03H 1/02; G09G 3/20; G02F 1/133626; H04N 9/3102; H04N 9/3141; H04N 9/3161; H04N 9/3179; H04N 9/3194; G03B 21/00
See application file for complete search history.

(56) References Cited

U.S. PATENT DOCUMENTS

| 2014/0198141 | A1 | 7/2014 | Kasazumi et al. |
| 2015/0085332 | A1 | 3/2015 | Yoshida |
| 2017/0006279 | A1* | 1/2017 | Eichenlaub .......... H04N 13/356 |

FOREIGN PATENT DOCUMENTS

| EP | 2030072 B1 | 12/2012 | |
| EP | 3408711 B1 | 6/2019 | |
| GB | 2498170 A | 7/2013 | |
| GB | 2501112 A | 10/2013 | |
| GB | 2552850 A | 2/2018 | |
| GB | 2552851 A | 2/2018 | |
| GB | 2554472 A | 4/2018 | |
| GB | 2559112 A | 8/2018 | |
| WO | 2018/100397 A1 | 6/2018 | |
| WO | WO-2018100395 A1 * | 6/2018 | ......... G02B 27/0172 |

* cited by examiner

*Primary Examiner* — Towfiq Elahi
(74) *Attorney, Agent, or Firm* — McDonnell Boehnen Hulbert & Berghoff LLP

(57) ABSTRACT

A method and system for improving the control of a holographic projection system in order to meet, or to attempt to meet, one or more targets or aims for a holographically reconstructed image that is produced by the holographic projection system. The target, or aim, may concern the luminance of part or all of the holographically reconstructed image.

18 Claims, 9 Drawing Sheets

HOLOGRAPHIC PROJECTION

CROSS-REFERENCE TO RELATED APPLICATIONS

The present application is a non-provisional patent application claiming priority to United Kingdom Patent Application No. GB 2015652.7, filed Oct. 2, 2020, the contents of which are hereby incorporated by reference in their entirety.

FIELD OF THE DISCLOSURE

The present disclosure relates to image projection. More specifically, the present disclosure relates to a method of holographic projection and holographic projection system. Some embodiments relate to luminance control and image generation for a holographic projection system. Some embodiments relate to a head-up display and a head-mounted display. Some embodiments relate to a method of controlling image brightness in a holographic projection system.

BACKGROUND

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A moving diffuser may be used to improve image quality in devices which use coherent light such as holographic projectors.

There is disclosed herein an improved method of holographic projection and improved holographic projection system.

SUMMARY

Aspects of the present disclosure are defined in the appended independent claims.

In general terms, a method and system are provided for improving the control of a holographic projection system in order to meet, or to attempt to meet, one or more targets or aims for a holographically reconstructed image that is produced by the holographic projection system. The target, or aim, may concern the luminance of part or all of the holographically reconstructed image. Luminance is a known measure of light intensity, which can be measured in units of Candela per square meter ($cdm^{-2}$), and which can affect the subjective human perception of the 'brightness' of an image.

The method and system comprise applying a software-based modification to an image, or image frame, before a hologram is created of the image (frame), and before that hologram is illuminated to form a holographic reconstruction of the image (frame). The modification may comprise altering a parameter of at least part of the image (frame), and generating the hologram to represent the altered image (frame), so that the resulting holographic reconstruction—or, a corresponding part of the resulting holographic reconstruction—will exhibit certain characteristics, which may be related to the luminance of the holographically reconstructed image (frame).

The modification of the image (frame) may be made in order to restrict a parameter of the resulting holographic reconstruction to lie within certain limits. For example, the modification may comprise altering the grey level of (part of) the image (frame), so that the corresponding (part of the) resulting holographic reconstruction will exhibit a luminance—or, a parameter related to luminance—that lies within a predetermined preferred operating range, for a light detector that is configured to detect light in that (part of the) holographic reconstruction. By ensuring that the detected parameter lies within a predetermined preferred operating range, the accuracy and reliability of any light detection signals output by the light detector in relation to that (part of the) holographic reconstruction is improved. Thus, if one or more of such light detection signals is fed back to a controller of the holographic projection system, in order to inform and control its subsequent operation, the information provided by the signal(s) is more accurate and reliable, which in turn can lead to subsequent operation of the system being controlled more reliably and, in many cases, more efficiently. For example, it may enable fewer iterations or a feedback loop to be cycled through before a controller is able to attain a target for the system, such as a target luminance for part or all of a holographic reconstruction, based on the improved light detection signals. Moreover, the present method and system can help avoid scenarios in which, conventionally, the light detection signals from a light detector may have been incorrect or incomplete, for example due to light saturation at high ambient light levels and/or due to the effects of background photoelectric noise at low ambient light levels.

According to an aspect, a method of holographic projection is provided, the method comprising receiving an image for projection and forming an image frame comprising a first image region and second image region, wherein the first image region corresponds to the image and the second image region corresponds to non-image content representative of a system control parameter. The method further comprises applying a first gain factor to the non-image content in order to change a grey level of the non-image content of the image frame. The method further comprises calculating a hologram of the image frame, displaying the hologram, and illuminating the hologram with light from a light source to form a holographic reconstruction of the image frame. It further comprises measuring a parameter representative of the luminance of the holographic reconstruction of the non-image content and scaling the measured parameter in accordance with an inverse of the first gain factor, to obtain a parameter value that is representative of a true luminance of the holographic reconstruction of the non-image content. The method further comprises controlling the optical power of the light illuminating the hologram until a measure of the true luminance of the holographic reconstruction of the non-image content indicates that a target luminance is met, for the holographic reconstruction of the image content of the image frame.

The image received by the holographic projection system may be referred to as an 'input image' or as a 'target image'. The method may comprise receiving a plurality of images, one after another. For example, each image may comprise a still frame of a moving video.

The second image region of the image frame may correspond to 'non-image content' in the sense that its content may not be intended for viewing by a viewer. Instead, the purpose of the second image region may be to provide a signal, or output, having one or more parameters that may be detected, and/or monitored, and/or measured.

The system control parameter that the non-image content in the second image region is representative of may have a pre-determined relationship with one or more corresponding system control parameters for the image content in the holographic reconstruction of the first image region. For example, the system control parameter may comprise optical power or luminance. For example, the system control parameter may comprise a voltage or a current.

The second image region in the image frame may comprise a simple formation such as a spot or other small shape. When a hologram is made, of the image frame, and holographically reconstructed, the corresponding secondary region of the resulting holographic reconstruction may be small and may be visually substantially insignificant to a viewer. For example, it may be physically separated from a primary region of the holographic reconstruction, which corresponds to the primary image region of the image frame and which is intended to be viewed and understood by a viewer. Nonetheless, the secondary region of the holographic reconstruction may be detectable by one or more sensors, such as a light sensor (or photodiode). A parameter of the secondary region of the holographic reconstruction may be measurable, using such a detector. Moreover, a measured parameter of the secondary region may be relatable to a corresponding parameter of the primary region. For example, the luminance of the two regions may have a predetermined relationship, based on the number of pixels in each respective region and the amount of light that is applied to illuminate the corresponding hologram. Thus, a measurement representing a luminance of the secondary region may be used to make a determination about the luminance of the primary region.

The step of applying a first gain factor to the non-image content of an image frame, in order to change its grey level, may comprise scaling its grey level—i.e. multiplying a value of its grey level (or 'greyscale level') by a factor. The factor may be a whole number or a decimal and it may be less than or greater than one. The factor may, in effect, equal one if it is deemed that no change should be applied to the grey level of the non-image content of the image frame.

The gain factor may be calculated based on the 'true' (i.e. unmodified) grey level of the non-image content of the image frame and on an expected value of a parameter for the corresponding secondary region of the resulting holographic reconstruction, if a hologram was generated and illuminated, representing the unmodified image frame. It may, for example, be based on an expected value of a measurable parameter of that secondary region, based on a present or target operating condition such as a present or target optical power of the light source that would illuminate the hologram. It may further be calculated based on one or more operating limits, ranges or thresholds for one or more detectors that is configured to detect light in the secondary region of the holographic reconstruction. Other factors may also be considered, such as present and/or expected ambient light conditions.

The calculated hologram, of the image frame, may be displayed on any suitable device. For example, it may be displayed on a pixelated display device such as a spatial light modulator (SLM). For example, the spatial light modulator may comprise a liquid crystal on silicon (LCOS) device.

The step of measuring a parameter representative of the luminance of the holographic reconstruction of the non-image content may comprise measuring the luminance of the secondary region of the holographic reconstruction directly, or it may comprise measuring another parameter, such as a voltage, current or optical power for the secondary region of the holographic reconstruction.

The 'true luminance' of the holographic reconstruction of the non-image content of the image frame (i.e. the true luminance of the secondary region of the holographic reconstruction) may be regarded as being the value of the luminance (i.e., the amount of luminance) that the secondary region would have exhibited, had the gain factor not being applied to the secondary image region of the corresponding image, before the corresponding hologram was generated and illuminated.

The parameter representative of the luminance of the holographic reconstruction of the non-image content may be input to a controller, for example as part of a feedback control loop. The controller may use that parameter, or a calculated value of the true luminance of the non-image content, to control the optical power of the light illuminating the hologram. For example, it may use a relationship or ratio between the luminance of the non-image and image portions (i.e. of the secondary and primary regions) of the holographic reconstruction, in conjunction with the measured or calculated value of the true luminance of the non-image content, to change the optical power of the light until it determines that an optical power has been reached for which the target luminance will be met, for the primary region of the holographic reconstruction.

The method may further comprise calculating a parameter value that is representative of a luminance of the holographic reconstruction of the image content of the image frame, using the parameter value that is representative of the true luminance of the holographic reconstruction of the non-image content. It may use the true luminance of the non-image content directly, or it may use the measured parameter of the luminance of the secondary region, in conjunction with the gain factor (or an inverse of the gain factor) to determine the luminance of the primary region of the holographic reconstruction.

The method may comprise receiving further images for projection, one at a time, and performing the above steps to calculate a true luminance of a secondary region of the holographic reconstruction of each received image, and to dynamically control the optical power of the light source, in order that the luminance of the holographic projection of each image is substantially the same. In some cases, a target for the luminance of the image content of the holographic reconstruction may change, for example due to external factors such as ambient light conditions or user demands and so on.

The first gain factor may be changed in response to the measured parameter representative of luminance and the parameter may be measured again, after that change. The first gain factor may be changed, multiple times, as part of a feedback loop for an image frame, until a target, aim or requirement is met. This may be done very rapidly.

The first gain factor may be increased if the measured parameter representative of luminance is above a first threshold level, or decreased if the measured parameter representative of luminance is below a second threshold level, wherein the first threshold level is associated with saturation of a photodetector (i.e. a light sensor) measuring the luminance and the second threshold level is associated with a noise level of the photodetector.

The first gain factor may (initially) be determined based on the target luminance for the primary region of the holographic reconstruction, which comprises the image content. It may be changed or refined, for example based on inputs from a feedback loop. The size of the first gain factor may be inversely proportional to the target luminance.

The method may comprise determining a pixel usage of the image and the first gain factor may be determined, at least in part, based on the pixel usage. The first gain factor may be proportional to the pixel usage. That is; if more pixels are used in an image, or image frame, the expected luminance of each pixel of the corresponding holographic reconstruction will decrease, for a given optical power of the light source. Therefore, the gain factor may have to be higher, for an image (frame) with more pixels.

The pixel usage may be equal to the sum of the all the grey level values of the image (frame) divided by the total number of pixels of the region.

Measuring the luminance may be performed using a photodetector and amplifier circuit, wherein the method further comprises the amplifier circuit applying a second gain factor to the electrical signal generated by the photodiode in response to received light of the second image region and the luminance may be scaled in accordance with the first and second gain factors.

The method may be a computer-implemented method.

According to an aspect, a computer program is provided comprising instructions which, when executed by data processing apparatus, causes the data processing apparatus to perform a method according to any of the aspects herein. According to an aspect, a computer readable medium is provided, storing such a computer program.

According to an aspect, a holographic projection system is provided comprising a spatial light modulator (SLM) arranged to display a diffractive pattern comprising a hologram, a light source arranged to illuminate the diffractive pattern in order to form a holographic reconstruction of the structured light pattern, a light detector arranged to detect light from the holographic reconstruction and to output a respective detected light signal, and an image processor arranged to receive an image for projection and to form an image frame comprising a first image region and second image region, wherein the first image region corresponds to the image and the second image region corresponds to non-image content representative of a system control parameter. The image processor is further arranged to apply a first gain factor to the non-image content in order to change a grey level of the non-image content of the image frame, and to calculate a hologram of the image frame. The system further comprises a controller arranged to receive the respective detected light signal from the light detector and to obtain a measure of a parameter representative of the luminance of the holographic reconstruction of the non-image content, from said detected light signal. The controller is further arranged to scale the measured parameter in accordance with an inverse of the first gain factor, to obtain a parameter value that is representative of true luminance of the holographic reconstruction of the non-image content, and to control the optical power of the light source, illuminating the hologram, until the true luminance of the holographic reconstruction of the non-image content indicates that a target luminance is met, for the holographic reconstruction of the image content of the image frame.

The controller may be further arranged to calculate a parameter value that is representative of a luminance of the holographic reconstruction of the image content, using the parameter value that is representative of the true luminance of the holographic reconstruction of the non-image content.

The spatial light modulator (SLM) may be arranged to provide a synchronisation signal to the controller. For example, the SLM may be arranged to provide a synchronisation signal to ensure that the controller makes determinations in relation to the correct (i.e. to the presently-displayed) hologram, and that its determinations are based on the correct gain factor that has been applied to the non-image content of the corresponding image frame, which that hologram represents, at a given time.

The image processor and/or the controller may be arranged to carry out the method of any of the above aspects.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE FIGURES

The above, as well as additional, features will be better understood through the following illustrative and non-limiting detailed description of example embodiments, with reference to the appended drawings.

The same reference numbers will be used throughout the drawings to refer to the same or like parts.

DETAILED DESCRIPTION

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
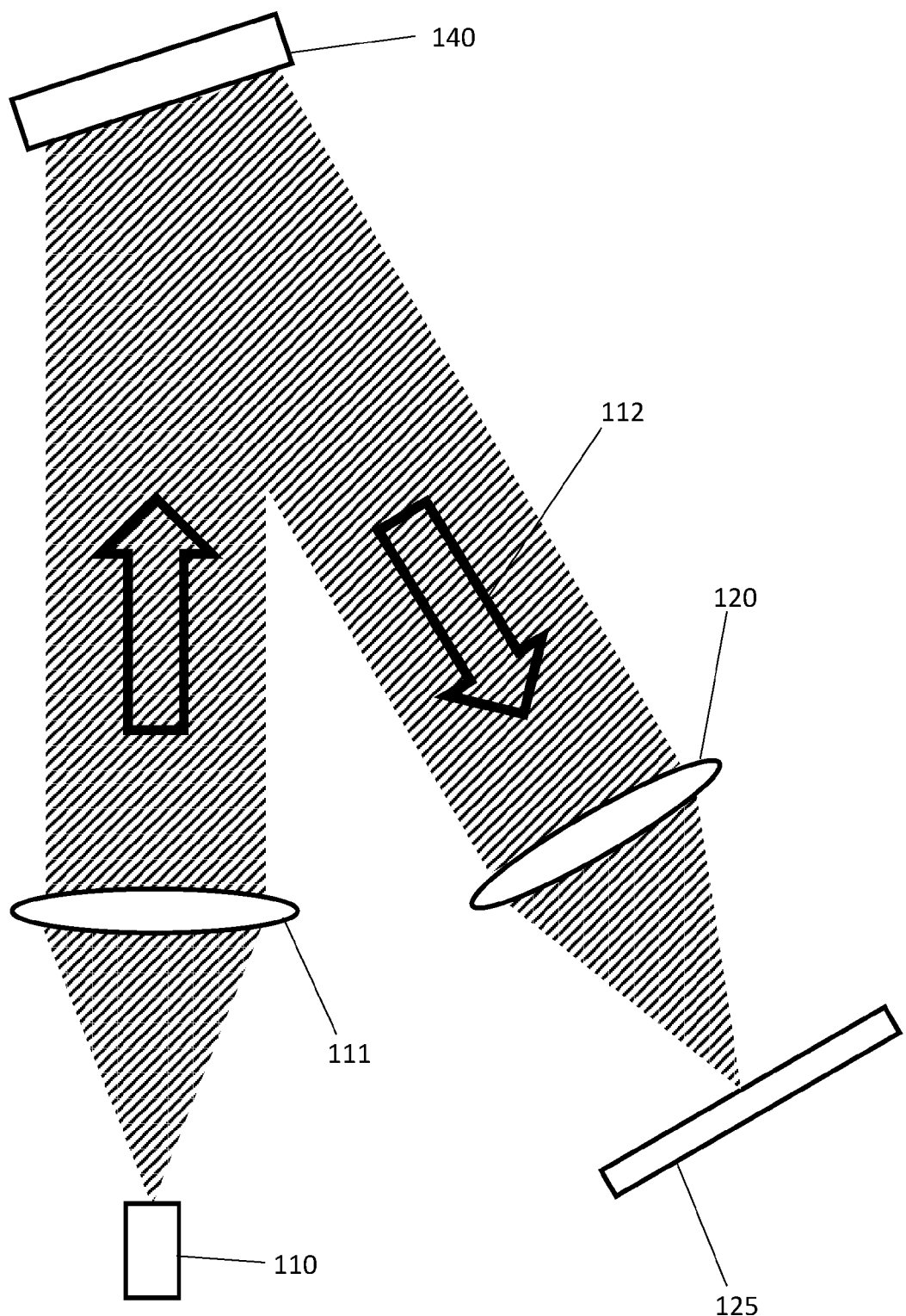
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, IA(x, y) and IB(x, y), in the planes A and B respectively, are known and IA(x, y) and IB(x, y) are related by a single Fourier transform. With the given intensity cross-sections, an approximation to the phase distribution in the planes A and B, TA(x, y) and TB(x, y) respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of IA(x, y) and IB(x, y), between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in United Kingdom patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information T [u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information Ψ[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
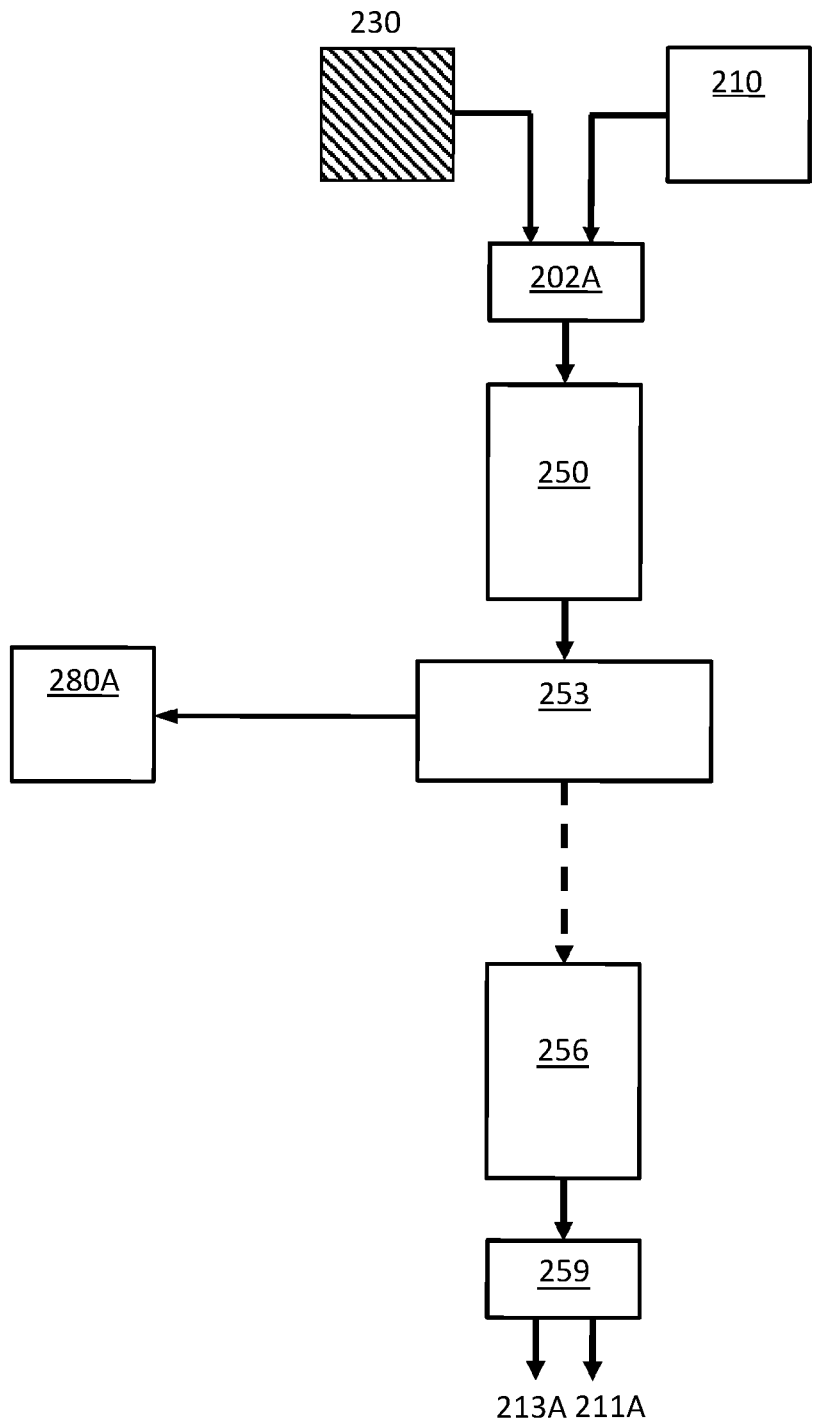
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
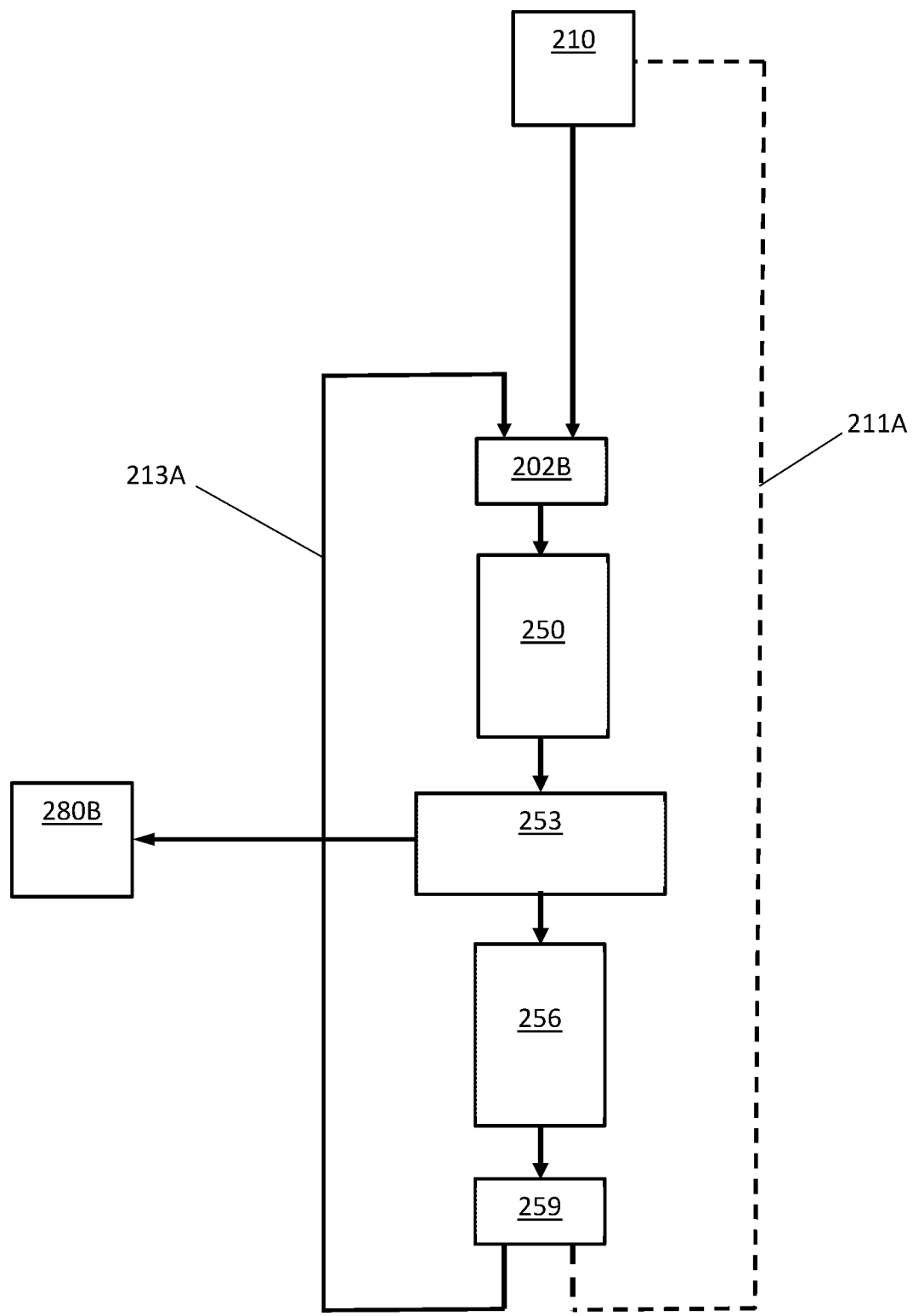
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
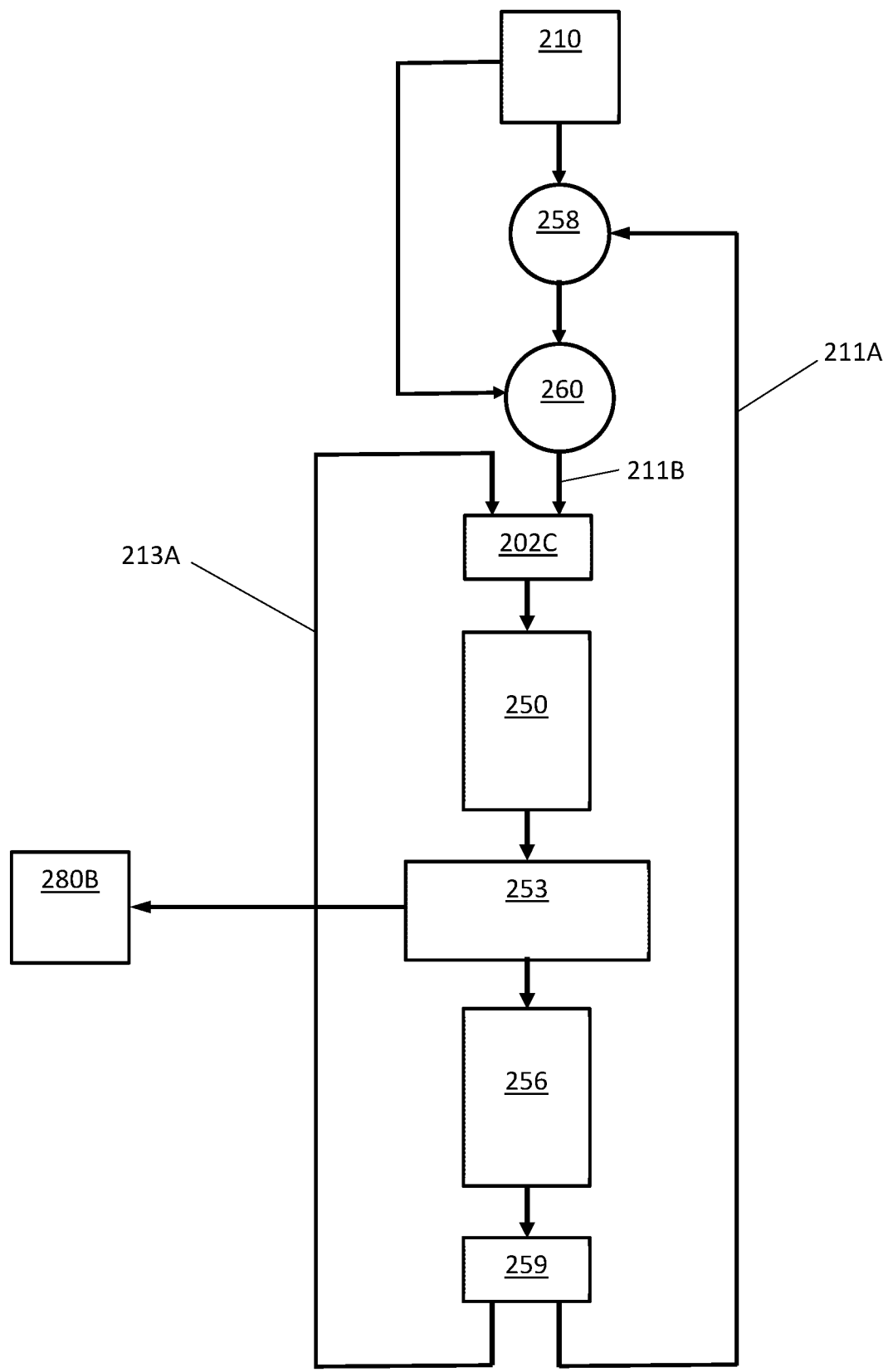
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

where:
$F'$ is the inverse Fourier transform;
$F$ is the forward Fourier transform;
$R[x, y]$ is the complex data set output by the third processing block 256;
$T[x, y]$ is the input or target image;
$\angle$ is the phase component;
$\Psi$ is the phase-only hologram 280B;

η is the new distribution of magnitude values 211B; and α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
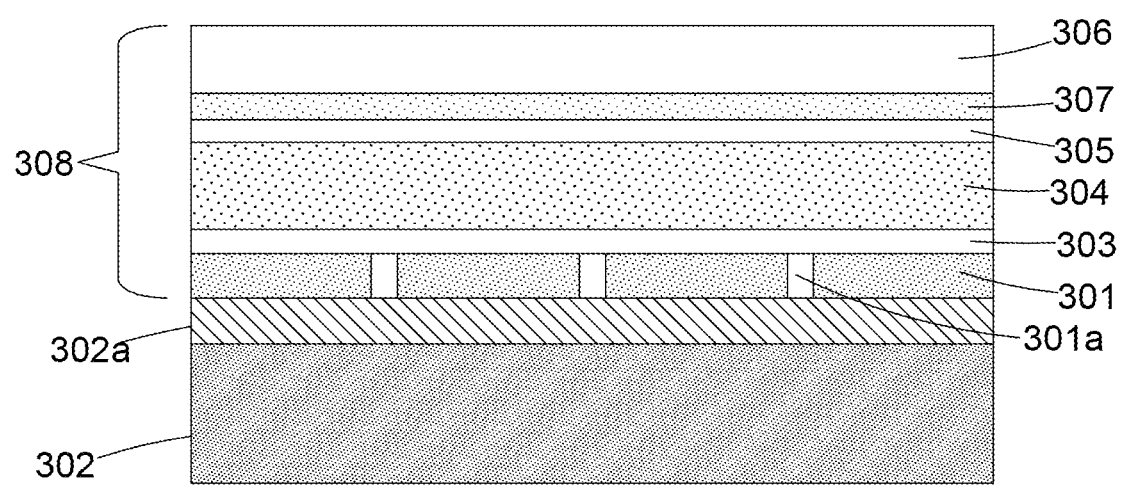
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Holographic Projection System

Figure 4A:
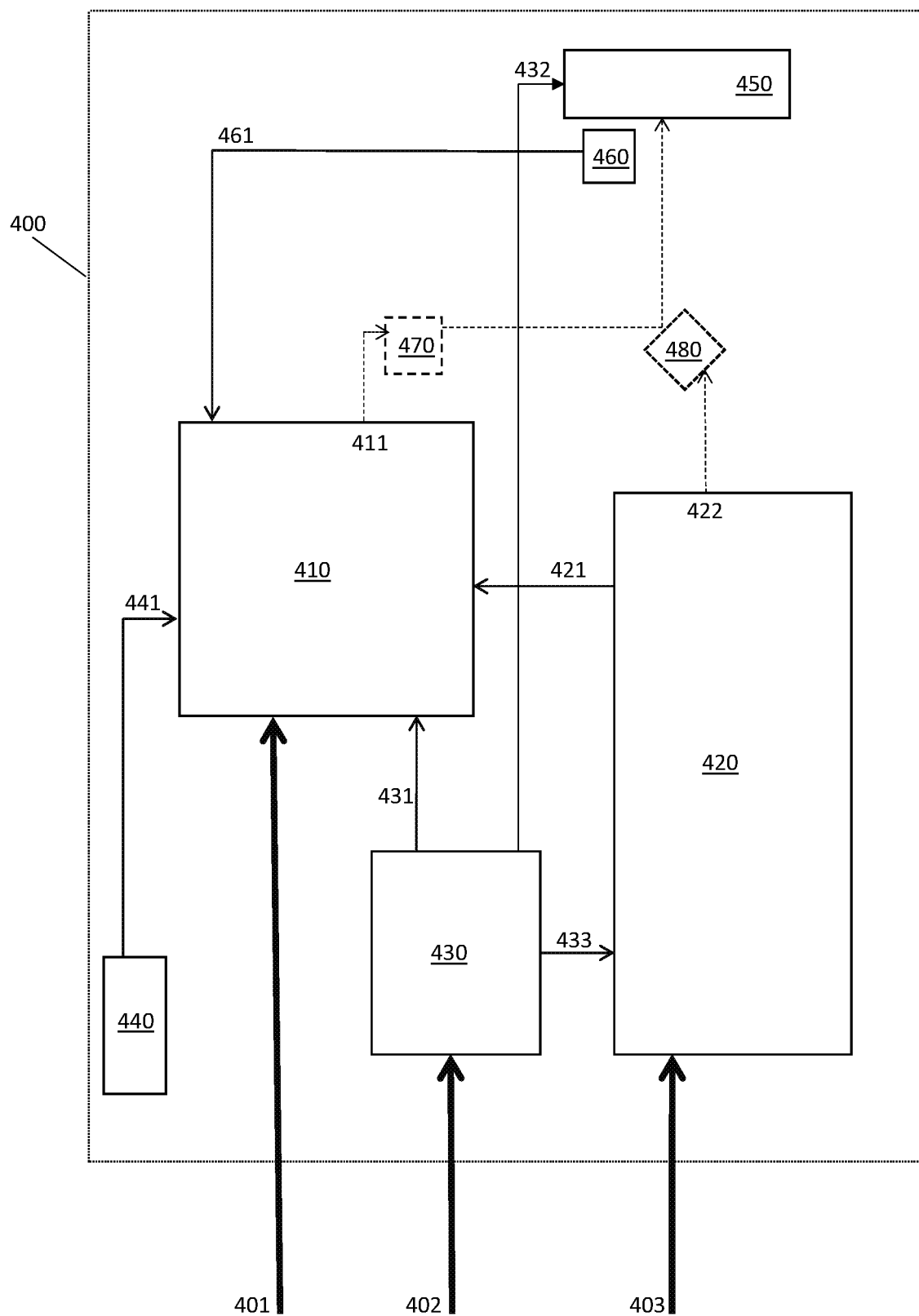
FIG. 4a shows a known holographic projection system.

FIG. 4a shows a known holographic projection system 400. This is described in United Kingdom patent GB2554472, the entirety of which is incorporated herein by reference. The present disclosure is not limited to a holographic projection system 400 as shown in FIG. 4a. However, FIG. 4a is an example of a possible arrangement of a holographic projection system, to which the improved methods disclosed herein may be applied.

The holographic projection system 400 in FIG. 4a comprises a first input 401, a second input 402, comprising a power input, and a third input 403. The holographic projection system 400 comprises a laser controller 410, a LCOS driver 420, a power transformer 430, an ambient light sensor 440, a light receiving surface 450, for example a diffuser or screen, a light sensor 460, a laser 470 and an SLM 480.

The first input 401 comprises a control signal, for example a USB control signal, which is received by a first input of laser controller 410. The laser controller 410 is further arranged to receive first power 431 from the power transformer 430, a synchronisation signal 421 from the LCOS driver 420, an ambient light signal 441 from ambient light sensor 440 and a light detection signal 461 from the light sensor 460. The laser driver output 411 is connected to the laser 470.

The second input 402 for power to the holographic projection system 400 is received by the input of power transformer 430. The power transformer 430 comprises: a first output providing first power 431 to the laser controller 410; a second output providing second power 432 to the diffuser 450; and a third output providing third power 433 to the LCOS driver 420. In some arrangements, the diffuser is not powered and second power 432 may be omitted.

The third input 403 to the holographic projection system 400, which may comprise a HDMI input, is received by a first input of LCOS driver 420. The LCOS driver 420 is further arranged to receive third power 433 from the power transformer 430, as described above. The LCOS driver is arranged to output the synchronisation signal 421 to the laser controller 410 and a control signal 422 (comprising light modulation data) to the SLM 480.

The laser 470 is arranged to irradiate the SLM 480 in accordance with the laser driver output 411. Each pixel of the SLM receives a portion of the incident light. The SLM 480 is arranged to be controlled in accordance with the control signal 422 to spatially modulate the received light. The control signal 422 comprises instruction representing a hologram. That is, the control signal 422 comprises holographic data. Each pixel of the SLM is individually addressed to independently modulate a corresponding portion of the incident light. The pixels collectively represent a holographic pattern. Accordingly, a light modulation pattern or distribution is applied to the received wavefront. In some arrangements, a phase-delay distribution is applied to the wavefront. It may be said that the SLM "displays" the hologram.

The spatially modulated light from the SLM 480 forms an image on the light receiving surface 450, providing the replay field. The image is a holographic reconstruction. The holographic reconstruction is formed within a holographic replay area on a holographic replay plane. The holographic reconstruction may require optics, such as a Fourier transform lens, not shown in FIG. 4a. Alternatively, the control signal 422 may further comprises additional holographic data arranged to perform the reconstruction, or the SLM may comprise other holographic components that enable the holographic reconstruction, without a need for physical optics.

Light Detection in a Holographic Projection System

It is known to use a light sensor to detect light from a light receiving surface in a holographic projection system and to use light detection information obtained by such a light sensor to inform and/or to control operation of the holographic projection system, for example to control the light source that is arranged to irradiate the SLM. For example, in FIG. 4a the light sensor 460 is arranged to detect light from the light receiving surface 450 therein, wherein a light detection signal 461 from the light sensor 460 is fed back to the laser controller 410 and may be used, by the laser controller 410, to inform or control one or more operational parameters for the laser 470, for irradiating the SLM 480. The light detection signal 461 may comprise information regarding a parameter such as, for example, optical power, or brightness, or luminance of some or all of a holographic reconstruction on the light receiving surface 450. That information may be used, by the laser controller 410, to control operation of the laser 470, for the current image frame and/or for a subsequent image frame. This may be implemented as part of a closed-loop feedback system with an aim, for example, of achieving a consistent level of image brightness/luminance across multiple successive image frames, or of attaining a particular level of image brightness/luminance for a particular frame or frames, or at a particular time or times. This is described in more detail in GB2554472 which, as mentioned above, is incorporated herein by reference.

It is also known that, for a holographic projection system, the brightness of a holographic reconstruction (referred to herein as an 'image' on a holographic plane) is dependent on how much image content is displayed. Specifically, if more content is displayed in the image, the brightness of the image decreases, as the luminance falls. The term 'luminance' will be known to the skilled reader as being a measure of luminous intensity, which can be measured in units of Candela per square meter (cdm-2). This relationship between brightness of a holographic reconstruction and the amount of image content therein arises because, in a diffractive holographic process, unlike conventional display technologies, the input light is divided by the across the image (which, it will be recalled, is the portion of the replay field that receives light). It may be considered that there is an inverse relationship between the amount of information content and optical power. For example, a holographic image of one unit of area will be ten times brighter than an image formed of ten units of area.

The above being the case, it is known to use a secondary image region, within a holographically reconstructed image, in order to obtain information regarding the optical power, or brightness, or luminance, of a primary image region within that image. The information on the brightness of the primary image region may be provided by directing some of the light, within the holographic replay field, to the secondary image region and monitoring the optical power of the secondary image region. The optical power of the secondary image region is directly representative of the radiant flux (Js-1 m2) or luminance (cdm-2), and hence the brightness, of the image (those parts of the replay field that are illuminated). In particular, the second image region can provide information on the brightness of the primary image region if the secondary image region is of a fixed area and/or the area of the secondary image region is considered. This can be done without affecting the image content in the primary image region.

Figure 5:
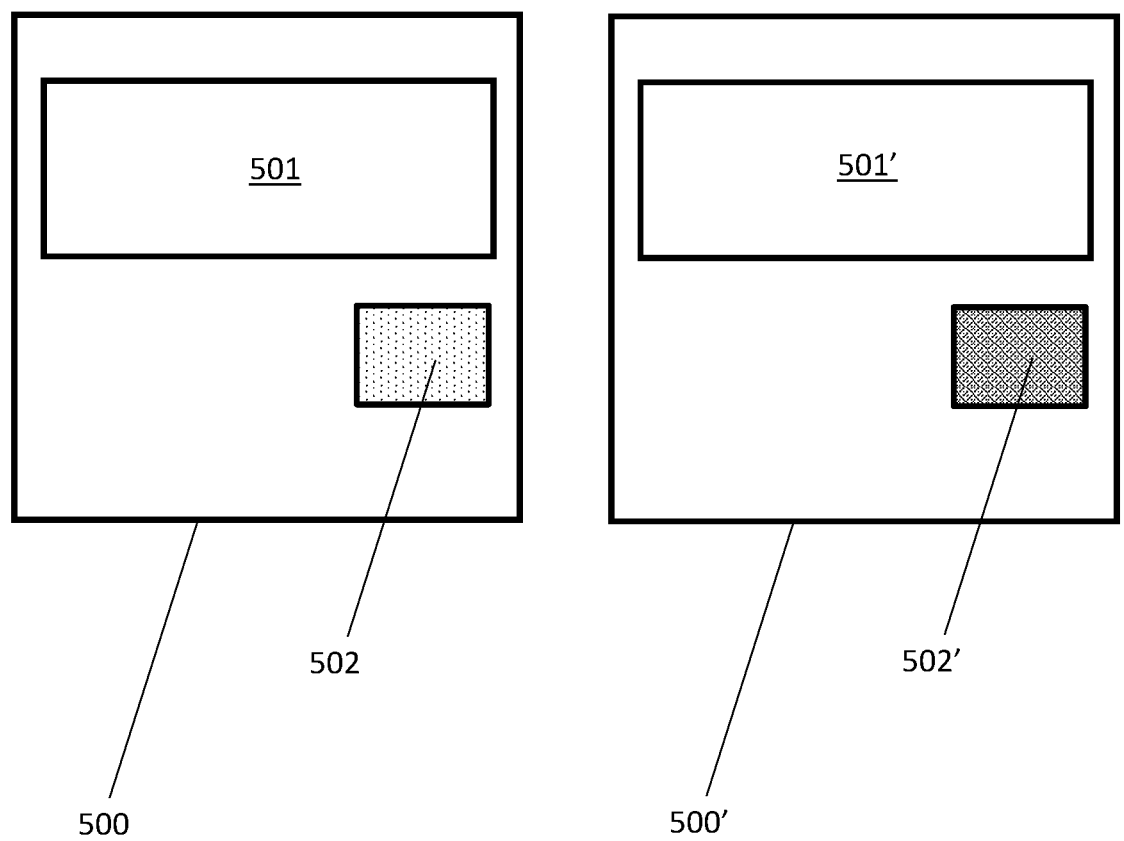
FIG. 5 shows first and second image frames, in accordance with embodiments.

Therefore, in some arrangements, a holographically reconstructed image has a primary image region comprising information for a user and a secondary image region, different from the primary region, which may be spaced apart from the primary image region. In some arrangements, any remaining area of the image may be used as a noise dump. The primary image region may comprise any suitable information that is intended to be visible to (and, indeed, intended to be viewed by) the user. For example, it may comprise augmented reality information such as information indicating speed or location. On the other hand, the secondary image region may comprise no content that is intended for the user, but may instead comprise content that is only intended for use by the holographic projection system, for example as part of a closed-loop feedback control. Such content may be referred to a being 'control information' since it is used by the projection system rather than by a user or viewer of the image. One or more parameters of the secondary image region may be detected, and/or monitored, and/or measured, in order to obtain indications of one or more parameters of the primary image region. The control information in the secondary image region may therefore be referred to as comprising one or more 'system control parameters'. FIG. 5 comprises two images 500, 500', each of which has a respective primary image region 501, 501' and a respective secondary image region 502, 502', which will be discussed in more detail below in relation to the improved methods that are disclosed herein.

The respective light patterns for the primary image region and the secondary image region of an image can both be generated from a common hologram, such as a computer-generated hologram (CGH). Advantageously, light can be readily directed to a secondary image region by a hologram, such as a computer-generated hologram (CGH), without adversely affecting the primary image region or obscuring the user's view of the information displayed in the primary image region. When the SLM displaying such a hologram is illuminated, within a holographic projection system, the light directed to the primary image region combines to form useful information or data for a user. The light directed to the secondary image region may, on the other hand, not combine to form any information or data for the user. The secondary image region may comprise a spot or other shape of light, but any preferred light pattern may be directed to the secondary image region.

Referring again to the holographic projection system of FIG. 4a; in some arrangements, the light sensor 460 is arranged to measure the optical power of the secondary image region in an image that is formed within a holographic replay field, on a holographic replay plane. In FIG. 4a, there is a light receiving surface 450 located at the holographic replay plane, such that the holographically reconstructed image is formed on the light receiving surface 450. However, a light receiving surface 450 is not essential, and will not be present in all arrangements. That is, the light sensor 460 is arranged to receive light diffusely reflected (or transmitted) by the portion of the light receiving surface 450 corresponding to the secondary image region (or to receive light intercepted whilst travelling to the portion of the light receiving surface 450 corresponding to the secondary image region). The light sensor 460 may be positioned in front of the light receiving surface 450 or behind the light receiving surface 450. In some arrangements not shown, the light sensor 460 is positioned behind the light receiving surface 450 to provide a despeckling effect which reduces noise. The light sensor 460 may be positioned before or after the light receiving surface 450, relative to a light path of light travelling from the SLM 480. In some arrangements, the secondary image region comprises information which is principally not intended for the user and which may not be visible to the user (i.e. to a human viewer). In some arrangements, light sensor 460 is arranged such that it does not receive any light from the primary image region. In some arrangements, the control information (secondary image region) can be positioned away from any content intended for a user. Accordingly, the control information may be physically spaced away from the content intended for the viewer so as not to impede the user's view.

Figure 4B:
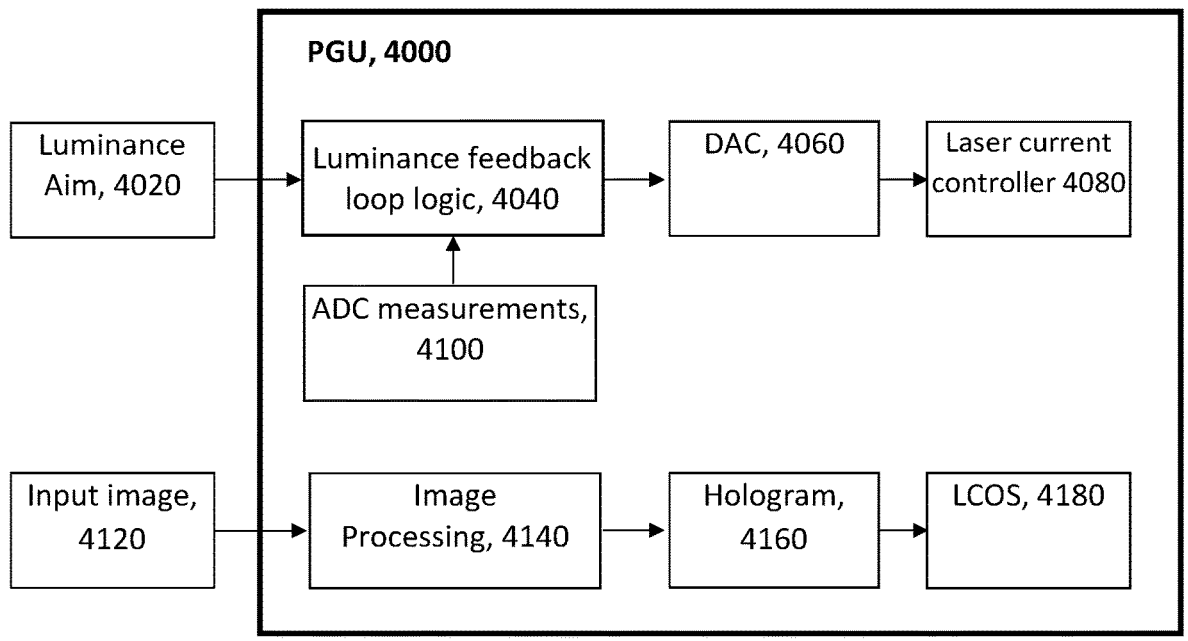
FIG. 4b shows image processing and luminance feedback in a known holographic projection system.

FIG. 4b shows a conventional arrangement for luminance control and image generation for a known holographic projection system (which may also be referred to as a 'holographic picture-generating unit (PGU)'). The arrangement in FIG. 4b may apply to a holographic projection system in which light within a secondary image region of a holographically reconstructed image is sensed, to obtain information on the optical power, or luminance, or brightness, of a primary image region of that image. However, the present disclosure is not limited to such an arrangement and may also be applied to other holographic projection system arrangements.

In FIG. 4b, a feedback loop is provided regarding the luminance of a holographically reconstructed image, which is produced by a holographic projection system, or holographic PGU 4000. That luminance may be the luminance of a component part or region of such an image, or of more than one such region, or of the entire image. For succinctness, in this description, we will refer to the luminance of 'the image', to cover all such possibilities.

In FIG. 4b, there is a 'luminance aim' 4020 for the image. That luminance aim may be constant over a period of time, during which a plurality of images will be displayed, one after the other, or it may vary dynamically. The luminance aim may, for example, comprise a target brightness, or target luminance, for (all or part of) the image. In some cases, the luminance aim may be a maximum luminance value. The luminance aim 4020 is provided as an input to luminance feedback loop logic 4040, within the PGU 4000. As the skilled reader will appreciate, the luminance feedback loop logic may comprise any suitable combination of hardware and/or software components.

The luminance feedback loop logic 4040 provides an input to a Digital-to-Analogue converter (DAC) 4060, which in turn provides an input to a laser current controller 4080. The DAC 4060 and the laser current controller 4080 may each respectively comprise any suitable combination of hardware and/or software components. The laser current controller 4080 is arranged to modulate the brightness of a display—i.e. of a holographically reconstructed image, formed on a light receiving surface as a result of illumination of a hologram on a Liquid Crystal on Silicon spatial light modulator, 'LCOS 4180'—by modulating the current of the laser light source, which illuminates the LCOS 4180.

The luminance feedback loop logic 4040 is arranged to (try to) ensure that the laser current controller 4080 controls the laser in accordance with the luminance aim 4020, at a given time or times. For example, the aim may be for all the images in a succession of displayed images to have the same target luminance, in spite of the image content changing between successive image frames. In order to do so, the luminance feedback loop logic 4040 requires information regarding the luminance of the image, in real time. Therefore, there is an input to the luminance feedback loop logic 4040, which is FIG. 4*b* is referred to as 'ADC measurements 4100', which provides information regarding the luminance of the image. The ADC measurements 4100 in this example comprise the outputs of an Analogue-to-Digital (ADC) converter (not shown), which has an input from one or more light sensors, or photodiodes, that are arranged to detect light in the image and to transmit one or more light detection signals regarding the detected light. In some arrangements, the light sensor(s) are arranged to detect, and to measure, the amount of light in the image separately for 3 respective colours—red, green, and blue (RGB). The light sensor(s) is/are arranged to be illuminated by a pattern displayed within the image frame. That pattern may, for example, comprise a secondary image region within a holographically reconstructed image, as described above. But the present disclosure is not limited to such an arrangement and the light sensor(s) may instead be arranged to detect light from a primary image region or from another part or parts or from the whole of a holographically reconstructed image.

The PGU 4000 in FIG. 4*b* also comprises an image processing unit 4140 that is arranged to output a hologram 4160 that represents an input image 4120, which is input into the image processing unit 4140. In some arrangements the image processing unit 4140 is arranged to generate a computer-generated hologram (CGH), for example using one of the methods described hereabove. The image processing unit 4140 may be arranged to output multiple holograms 4160 in succession. It may therefore be arranged to generate and output holograms very quickly, based on a plurality of successive respective input images 4120. The hologram 4160 is arranged to be displayed on a spatial light modulator, which in FIG. 4*b* is LCOS 4180.

The laser current controller 4080 in the PGU 4000 is arranged to control a laser (not shown) that, in turn, is arranged to illuminate the LCOS 4180 in order to irradiate the hologram 4160 and form a holographically reconstructed image at a holographic replay plane, for example on a light receiving surface (not shown) located at the holographic replay plane. When an image is formed at the holographic replay plane, the light sensor or sensors detect light therein and transmit one or more light detection signals, which in FIG. 4*b* are input via the ADC measurements 4100, to the luminance feedback loop logic 4040. The luminance feedback loop logic 4040 is arranged to use the information comprised within the light detection signals to determine the luminance of the image at a given time and to make any necessary adjustments to the laser control, in order to control the brightness of the image and to thereby more closely match the luminance of the image to the luminance aim 4020.

Holographic Gain

The present inventors have recognised that light sensors (or 'photodiodes') have operational limitations that can adversely affect the accuracy and the range of their light detection capabilities. The present inventors have further recognised that this can have a knock-on effect on the ability of a holographic projection system, which relies on one or more such light sensors, to accurately and dynamically monitor and control the brightness of the holographically reconstructed images that it generates and displays.

For example, the present inventors have identified that, when a displayed image is at a low light level (i.e. at low luminance), the amount of light received by the photodiode might be below the photodiode's detection threshold. Therefore, the amount of light in the image will be too small to be detected. Moreover, in real systems, electronic noise might generate photocurrent, which can be higher than a photocurrent generated by the light coming from the image. Therefore, the detection of the light within the image can become obscured. Conversely, when a displayed image is at a high light level (i.e. at high luminance), the amount of light received by the photodiode can be higher than the saturation limit of the photodiode. Therefore, the amount of light in the image is too large to be measured precisely. As a result, in both these situations, the light detection signals generated by the photodiode, which are fed into the luminance feedback loop logic in the example arrangement of FIG. 4*b*, will be inaccurate or incomplete. Hence the luminance of the display cannot be controlled accurately at high and low light levels.

For example, the present inventors have identified that, when a holographic projection system is comprised within a heads-up display (HUD) in a vehicle, there is a very broad range of light conditions under which it must accurately operate. For example, it needs to operate in bright/direct sunlight and the pitch black of night. The target brightness, or luminance, of the holographic reconstruction in such a system is therefore likely to be, inter alia, a function of ambient light. In very bright light conditions, the system may have to increase the brightness of the HUD to a maximum so the image can be seen, by the user, despite the sunlight. Conversely, for night time conditions the system needs to reduce the brightness of the display so as not to blind the driver. The range required is extreme, by standards in display technology. However, the present inventors have recognised that the method disclosed herein can accommodate even such extreme demands and can ensure that it always operates in an optimum operating range for its photodiodes.

The present inventors have recognised that control of a holographic projection system can be improved by applying a software solution, which provides control over one or more optical properties of light in a region of a holographically reconstructed image. This can be done by modifying an image, or image frame, before generating the corresponding hologram and before that hologram is illuminated, to form the holographic reconstruction. Thus, the improved method described herein is proactive. The light in the controlled region of the holographically reconstructed image can be detected by one or more light sensors, and a light detection signal from said one or more light sensors can be input to a controller, for the holographic projection system. The controller can then make determinations about the image, based on the detected signals and taking into account the software control that was applied. For example, the light detection signal may be provided to a controller as part of a feedback control loop for the system. For example, the optical property may comprise any of: the optical power, the luminance, or the brightness of the light in the (region of the) image.

The present inventors have further recognised that an input image may be modified, or controlled, so that a magnitude (or, value, or, amount) of the optical property of the light is within a predefined range, or is above or below a predefined threshold magnitude (or, value, or, amount) for the corresponding light sensor or light sensors, which is/are arranged to detect that light. The predefined range and/or the predefined threshold or thresholds may represent conditions at which the operation of the light sensor or light sensors is/are considered to be accurate, at least to within an acceptable degree of tolerance. The predefined range and/or the predefined threshold or thresholds may correspond to optimal operating conditions for the light sensor(s). The predefined range and/or the predefined threshold or thresholds may substantially avoid sub-optimal operating conditions for the light sensor(s).

A light sensor will typically have a range of light levels (or luminance levels) for which it is able to detect light. The present inventors have recognised that it may be preferable to avoid a holographically reconstructed image (or a part of an image) that is to be detected having a light level (or luminance level) that is equal to or lower than the lowest point within the light sensor's range. It may also be preferable to avoid the image having a light level (or luminance level) that is greater than, but close to, the lowest point of the light sensor's range, as the operation of the light sensor may be less sensitive towards either end of its operational range and the light from the image may be obscured, from the light sensor's perspective, by photocurrent created by background noise components. Similarly, the present inventors have recognised that it may be preferable to avoid the image (or the part of the image) that is to be detected having a light level (or luminance level) that is equal to or greater than the highest point of the light sensor's range. It may also be preferable to avoid the image having a light level (or luminance level) that is greater than, but close to, the highest point of the light sensor's range, as the operation of the light sensor may be less sensitive towards either end of its operational range, and the light sensor may become saturated at high light levels.

The present inventors have created a method wherein the luminance of a holographically reconstructed image, or of a part of such an image, may be controlled so that it can be more accurately detected by a light sensor, within a holographic projection system. As a result, a more accurate light detection signal, regarding the image or the part of the image, can be input to a controller within the system, as a result of which the luminance of the image (or of a part of the image) can be better controlled. In some cases, this may involve matching the actual luminance at a time or times to a target luminance, or 'luminance aim'. The luminance aim may relate to a first part of a holographically reconstructed image and the method of controlling the luminance may relate to a second, different part of the holographically reconstructed image, as will be understood better from the detailed description that follows.

The present inventors have thus recognised that the control of the luminance of a part of a holographically reconstructed image, for example to accommodate requirements of one or more light sensors, can be decoupled from the control of the luminance of a different part of the holographically reconstructed image, for example to reach a luminance aim. For example, if a luminance aim dictates that a controller should change the operational parameters (e.g. increase the current to the light source) so that a first part of the holographically reconstructed image is made brighter, it may be determined that the brightness of a corresponding second part of the holographically reconstructed image, which is to be detected by the one or more light sensors, will be too high, such that the resulting light detection by the sensor(s) might not be sufficiently accurate or reliable. In such a case, the present methods may determine that the luminance of the second part of the holographically reconstructed image should be scaled down, so as to remain within a comfortable, more accurate operating range for the light sensor(s). This may be done without changing the brightness of the first part of the holographically reconstructed image, and thus without derogating from the luminance aim that is to be achieved for that first part of the image.

The control of the luminance of the holographically reconstructed image, or of a part of such an image, may be provided by applying a modification to part or all of a so-called 'target image'—or, to an image frame, comprising the target image—that is input into the holographic projection system, for holographic reconstruction. As will be understood better from the detailed description that follows below, that modification may be selected so as not to alter the image content of the holographically reconstructed image, vis-à-vis the target image, from a viewer's perspective, but to modify a luminance of a 'control' portion of the holographically reconstructed image that is to be detected, by a light sensor.

As described above, and as is well known to the skilled reader, a holographic projection system is typically configured to receive a target image, to obtain or to generate a hologram of that target image, to display the hologram on a display device such as an SLM, and to illuminate the hologram, displayed on the SLM, to form a holographic reconstruction of the target image at a holographic replay plane. The present method may comprise applying a modification or change to part of the target image (or to part of an image frame comprising the target image), before a hologram is obtained or generated, representing that target image.

The method described herein may be applied to (but is not restricted to) a target image for which an image frame having a primary image region, comprising image content intended to be viewed by a viewer, and a secondary primary region, comprising content that is not intended to be viewed by a viewer but that is intended to be detected by a light sensor, is created. In such an embodiment, the hologram is generated of the image frame, comprising the primary and secondary image regions. The image frame comprises an array of pixels, wherein each pixel has a grey level representative of a luminance level. The method may comprise applying a scaling factor to the content of the secondary image region, in order to change a greyscale level of the secondary image region. The scaling factor may be referred to as a 'multiplication factor' or as a 'holographic gain' or as a 'gain factor'. This may be understood further in relation to FIG. 5.

FIG. 5 comprises a first image frame 500 and a second image frame 500'. The second image frame 500' is a modified version of the first image frame 500, as will be understood further from the following description. The first image frame 500 comprises a respective primary image region 501 and a respective secondary image region 502. Similarly, the second image frame 500' comprises a respective primary image region 501' and a respective secondary image region 502'. The primary image region 501 of the first image frame 500 is substantially identical to the primary image region 501' of the second image frame 500'. It is formed from a target image that is input to a holographic projection system. The image content of each of the primary image regions 501, 501' is substantially identical to the image content of the target image, or at least to a portion of the target image for which a holographically reconstructed image is to be generated, and viewed by a viewer.

The secondary image region 502 of the first image frame 500 is physically separate to the primary image region 501 therein. As described in more detail hereabove and in United Kingdom patent No. GB2554472, the secondary image region 502 may be referred to as a 'control region'. It is included in the first image frame 500 in order to create a secondary region of a holographically reconstructed image, which may not contain content for the viewer to view, but the light from which may be detected and measured, in order to obtain information regarding the brightness, or luminance, of a primary region of the holographically reconstructed image, which contains the image content that is intended for the viewer to view. The secondary image region 502 may also be referred to as a ' power box' or as a 'power square', though it is not necessarily square shaped.

As detailed above, in some circumstances the light level (or, luminance level or, brightness level) of a secondary region of a holographically reconstructed image may not be suitable for detection by the one or more light sensors, or may be at risk of being inaccurately detected or inaccurately represented by a corresponding light detection signal, for example due to the effects of background photocurrent noise at low levels of light or due to oversaturation of the light sensor or sensors at high levels of light. The methods presented herein can address these issues by modifying the secondary image region 502 of the first image frame 500 and thereby forming the secondary image region 502' of the second image frame 500'. The modification comprises changing the greyscale level of the secondary image region 500 to form the secondary image region 502', wherein a hologram is subsequently generated representing the second image frame 500', instead of generating a hologram of the first image frame 500.

The concept of 'greyscale' will be well known to the skilled reader, and so will not be described in detail herein. In short, the greyscale value of an image pixel is a measure of the intensity of the light that is present at the pixel. When an image frame is converted to a hologram, the greyscale value of a pixel, within the image frame, corresponds to the amount of light energy that the hologram must diffract toward a corresponding pixel position of the reconstructed image, when a holographic reconstruction of the image frame is subsequently formed from that hologram. Thus, changing the greyscale of a pixel (or of a region comprising one or more pixels) in the image frame will manifest as a change of luminance, at a corresponding pixel position (or positions) in the corresponding holographically reconstructed image. For example, an image may comprise 256 greyscale levels: grey level 0 may be black and grey level 255 may be white. It will be understood that reference to 'greyscale' or 'grey level' does not imply a specific colour, or absence thereof, of an image but rather refers to discretised levels of brightness (luminance, intensity, etc.) for a given image area, for example a pixel of a digitised image.

In the present example, the secondary image region 502 of the first image frame 500 is modified by applying a scaling factor (or, 'multiplication factor', or, 'holographic gain', or 'gain factor') to one or more image pixels within the secondary image region 502, before it is converted to a hologram. The scaling factor multiplies the greyscale value of the image pixel or pixels, within the secondary image region 502. The scaling factor may be any suitable number, which may be a whole number or a decimal, and which may be more than or less than '1'. For example, for an image which has 256 greyscale levels, wherein level '255' represents full light (i.e. white) and level '0' represents no light (i.e. darkness, or blackness), a scaling factor of 0.5 may be applied to a pixel or pixels within a secondary image region, whose greyscale value is 255, as a result of which the greyscale value of the pixel would become 128 (rounded to the nearest whole number level). This would have the visible effect of changing the pixel(s) from being white to being mid-grey.

The greyscale value of the secondary image region 502' of the second image frame 500' in FIG. 5 is different to the greyscale value of the secondary image region 502 of the first image frame 500, by a factor that corresponds to the scaling factor that has been applied to the secondary image region 502 of the first image frame 500, to form the secondary image region 502' of the second image frame 500'.

According to an embodiment, when a holographic reconstruction is formed by illuminating the hologram of the second image frame 500', it has a secondary region that has a light level (or, luminance level or, brightness level) that is better suited to being reliably and accurately detected by the corresponding light sensor or light sensors, than a secondary region of a holographic reconstruction of the first image frame 500 would have been. Therefore, if the luminance level of the secondary region of a holographic reconstruction is (or is expected to be) high, a scaling factor that is less than 1 may be applied to the secondary image region, in order to make the resultant secondary region of the holographic reconstruction less bright, and therefore better suited to being accurately detected by a corresponding light sensor. Conversely, if the luminance level of the secondary region of a holographic reconstruction is (or is expected to be) low, a scaling factor that is more than 1 may be applied to the secondary image region, in order to make the resultant secondary region of the holographic reconstruction brighter, and therefore better suited to being accurately detected by a corresponding light sensor.

According to embodiments, the present method does not apply a scaling factor to the primary image region 501, before generation of the hologram. In other embodiments, a scaling factor may be applied to the primary image region 501, before generation of the hologram, to change the luminance of the portion of a holographically reconstructed image that corresponds to the primary image region 501. Such a scaling factor may be different to that which is applied to the secondary image region 502. There therefore may be a 'relative scaling factor', representing a ratio of the respective scaling factors that have been applied to the primary and secondary image regions, before generation of the hologram.

A controller of the holographic projection system therefore has to know whether a secondary image region has been modified, for each image frame that it holographically reconstructs. If the secondary image region has been modified by applying a scaling factor to the greyscale level of its pixel(s), the controller has to know the scaling factor by which the secondary image region has been scaled (either in absolute terms and/or relative to any scaling factor that was applied to the primary image region, before generation of the hologram). Moreover, because the scaling factor must be applied to the secondary image frame 502 before a hologram is generated, and therefore before the holographic reconstruction occurs, the controller of the system may require an indication of an expected luminance of a corresponding secondary region of the holographically reconstructed image, if a hologram was to be generated and illuminated to form the holographic reconstruction, in the absence of a scaling factor. This information will enable the controller to make a determination about whether, and by how what factor, to scale the greyscale level of the pixel(s) of the secondary image region, before the corresponding hologram is generated.

In some cases, a controller of a holographic projection system may make a determination about whether, and by what factor, to scale the greyscale level of the pixel(s) of a secondary image region, before the corresponding hologram is generated, based on an expected or predicted luminance level of the corresponding second region of a holographically reconstructed image. For example, the controller may determine that it will control the laser current in order to achieve a target luminance for the primary region of the image, and therefore calculate what the corresponding luminance of the secondary region of the image would be, at that laser current level. For example, the controller may use the detected luminance levels of the secondary regions of one or more preceding holographically reconstructed images, in order to determine an expected or predicted luminance level of the secondary region(s) of one or more upcoming (i.e. future) holographic reconstructions. If a calculated or expected luminance level for the secondary image region falls outside a predetermined operating range (or, above or below a predetermined threshold) for which the corresponding light sensor(s) is/are deemed to be accurate and reliable, the controller may determine that it is appropriate to scale the greyscale level of the secondary image region of the upcoming image frame(s), accordingly, before the corresponding hologram is generated and illuminated. Thus, the improved method described herein can provide proactive luminance control, rather than relying solely on reactive detection and modification.

For example, if the controller determines that a detected light signal indicates that the light sensor has detected light of a level that is at (or near) either end of its optimal operating range, this may trigger the controller to determine that it is appropriate to scale the greyscale level of the secondary image region of one or more upcoming image frame(s), accordingly, before the corresponding hologram(s) is/are generated and illuminated. In some cases, a controller may be arranged to provide luminance prediction, for one or more upcoming image frames. A determination regarding whether, and by what factor, the greyscale level of a secondary image region in an image frame should be scaled may be based on such a luminance prediction. This is discussed further in the 'luminance prediction' section of the description, below.

As mentioned above, in some cases, an expected luminance level of the secondary region(s) of one or more upcoming (i.e. future) holographic reconstructions may be determined, by a controller, in accordance with a luminance target, or luminance aim, which is input to the holographic projection system. That is; if the controller knows what a luminance aim is for (the primary region of) an upcoming holographic reconstruction, it will know what the corresponding luminance of the secondary region would be, if that luminance aim was achieved. The controller can use that knowledge to determine whether it would be appropriate to scale (i.e., to multiply) the greyscale level of the secondary image region, accordingly, before the corresponding hologram is generated and illuminated. This can be further understood in relation to FIG. 6.

Figure 6:
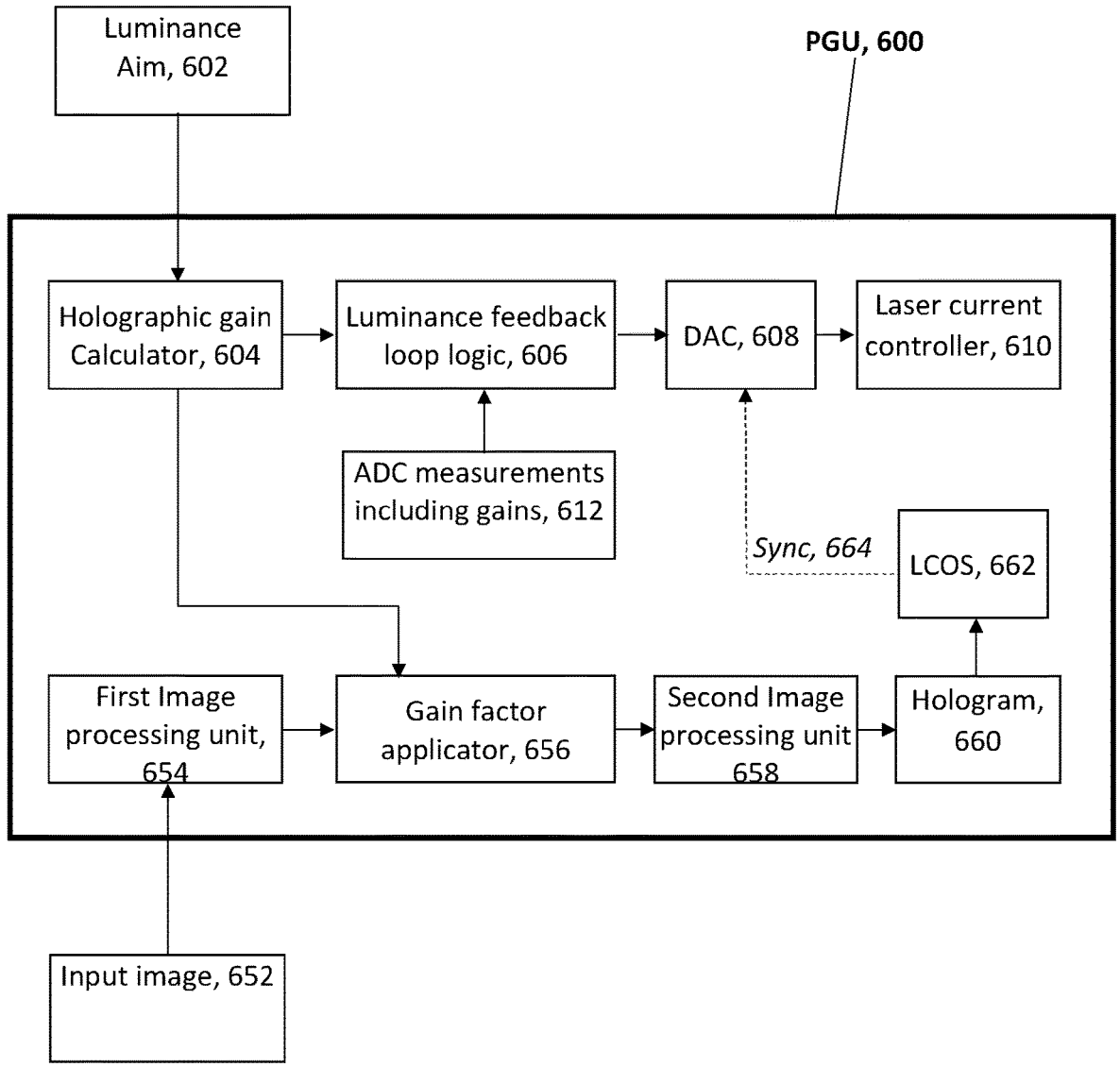
FIG. 6 shows image processing and luminance feedback in an improved holographic projection system in accordance with embodiments.

FIG. 6 shows an improved arrangement for luminance control and image generation for a holographic projection system (which may also be referred to as a 'holographic picture-generating unit (PGU)'). The arrangement in FIG. 6 may apply to a holographic projection system in which light within a secondary image region of a holographically reconstructed image is sensed, to obtain information on the optical power, or luminance, or brightness, of a primary image region of that image. However, the present disclosure is not limited to such an arrangement and may also be applied to other holographic projection system arrangements.

In FIG. 6, an improved feedback loop is provided regarding the luminance of a holographically reconstructed image, which is to be produced by a holographic projection system, which in FIG. 6 is shown as being a holographic PGU 600. That luminance may be the luminance of a component part or region of such an image, or of more than one such region, or of the entire image. For example, it may be the luminance of a primary region of a holographically reconstructed image, which corresponds to a primary image region on an image (frame) that is input to the PGU 600, as discussed above. For succinctness, in this description, we will refer to the luminance of 'the image', to cover all such possibilities.

In FIG. 6, there is a 'luminance aim' 602 for the image. That luminance aim (or, luminance target) may be constant over a period of time, or it may vary dynamically, for example in response to ambient light conditions. For example, it may vary between two or more individual successive image frames, that are to be holographically reconstructed by the PGU 600. The luminance aim 602 may, for example, comprise a target brightness, or target luminance, for the image. The luminance aim 602 is provided as an input to a holographic gain calculator 604, comprised within the PGU 600. The term 'holographic gain' is used, in relation to FIG. 6 herein, to refer to the multiplication factor, or scaling factor, that should be applied to part of an image frame (for example, a secondary image region therein) in order to change the luminance of a corresponding part of the holographically reconstructed image, which is to be detected by one or more light sensors. The holographic gain calculator is therefore arranged to calculate that multiplication factor. It may be arranged to calculate a multiplication factor for every input image (or every input image frame).

The holographic gain calculator may have one or more inputs thereto, in order to make its calculation. For example, it may have a target image (or target image frame)—which is shown as an 'input image 652' in FIG. 6—as an input, so that it knows a relationship between, for example, the number of pixels in a primary image region (to which the luminance aim 602 applies, in the corresponding primary region of the holographically reconstructed image) and the number of pixels in a secondary image region (which corresponds to the secondary 'control' region, which will be detected, in the holographically reconstructed image). This relationship may be fixed, so that every image frame has the same pixel ratio between its primary image region and its secondary image region.

The target image (frame) may, in some embodiments, comprise a warped image on a target image plane. The target image (frame) may, in some embodiments, be calculated for either a near-view or a far-view of an input image. The target image (frame) may comprise a power box and/or a power repository (sometimes referred to as a 'power dump') in an area such as a peripheral or border region, into which excess optical power may be directed, in the corresponding holographic reconstruction.

The holographic gain calculator may also have inputs relating to the present operating parameters of the PGU 600, such as the laser current that is being supplied to the laser light source (not shown), within the PGU 600. It may also have one or more measurements from a light sensor or sensors—shown as 'ADC measurements including gains 612', in FIG. 6—for one or more preceding image frames, as an input. As the label suggests, the 'ADC measurements including gains 612' may comprise a detection signal, which may include a measurement, of a secondary 'control' region in one or more preceding holographically reconstructed images, including any holographic gains (i.e. any scaling factors or multiplication factors) that were applied for generation of those secondary control regions, from corresponding holograms. The holographic gain calculator may be configured to respond to a preceding output of the sensor(s), for example to address a saturation problem. Typically, the feedback loop of the PGU 600 will operate so fast, that it can make changes or determinations relating to conditions for an immediately preceding image frame, and apply them to a current image frame, without the viewer noticing any perceptible difference or degradation in image quality or brightness.

The hologram gain calculator provides a calculated holographic gain (or, multiplication factor) as an output to a luminance feedback loop logic 606, within the PGU 600. The holographic gain calculator 604 and the luminance feedback loop logic 606 may each respectively comprise any suitable combination of hardware and/or software components. Moreover, although these are shown functionally as being two distinct components in FIG. 6, they may be comprised within (and their functions may be carried out by) a common (i.e. the same) controller or processor.

The luminance feedback loop logic 606 provides an input to a Digital-to-Analogue converter (DAC) 608, which in turn provides an input to a laser current controller 610. The DAC 608 and the laser current controller 610 may each respectively comprise any suitable combination of hardware and/or software components. The laser current controller 610 is arranged to modulate the brightness of a display—i.e. of a holographically reconstructed image, formed on a light receiving surface as a result of illumination of a hologram on a Liquid Crystal on Silicon spatial light modulator, 'LCOS 662'—by modulating the current of the laser light source (not shown), which illuminates the LCOS 662.

The luminance feedback loop logic 606 is arranged to (try to) ensure that the laser current controller controls the laser in accordance with the luminance aim 602, at a given time or times. In order to do so, the luminance feedback loop logic requires information regarding the luminance of the image, in real time. Therefore, the ADC measurements including gains 612, which provide information regarding the detected luminance of the (second region of the) holographically reconstructed image, are provided as an input to the luminance feedback loop 606. As mentioned above, the ADC measurements in FIG. 6 comprise the outputs of an Analogue-to-Digital (ADC) converter, which has an input from one or more light sensors, or photo diodes, that are arranged to detect light in the image and to transmit one or more light detection signals regarding the detected light. In some arrangements, the light sensor(s) are arranged to detect, and to measure, the amount of light in the image separately for 3 respective colours—red, green, and blue. The light sensor(s) is/are arranged to be illuminated by a pattern displayed within the holographically reconstructed image. That pattern may, for example, comprise a secondary image region within a holographically reconstructed image, as described above. But the present disclosure is not limited to such an arrangement and the light sensor(s) may instead be arranged to detect light from a primary image region or from another part or parts or whole of a holographically reconstructed image.

The PGU 600 in FIG. 6 also comprises an image processor that is arranged to output a hologram 660 that represents the input image 652, which is input into the image processing unit 654. In some embodiments, the image processor is arranged to generate a computer-generated hologram (CGH), for example using one of the methods described hereabove. The image processor may be arranged to output multiple holograms 660 in succession. It may therefore be arranged to generate and output holograms very quickly, based on a plurality of successive respective input images 652. The hologram 660 is arranged to be displayed on a spatial light modulator, which in FIG. 6 is LCOS 662.

The image processor is shown in FIG. 6 as comprising three parts—a first image processing unit 654, a gain factor applicator 656 and a second image processing unit 658. These three parts represent functional aspects of the image processor and may not, in practice, be three discrete physical units. Instead, two or more of the respective functions of the three parts of the image processor as will be described herein may be carried out by a common (i.e., the same) controller or processor. Returning to FIG. 6; the first image processing unit 654 is arranged to receive an input image 652 (or, a 'target image'). It may be arranged to transmit information regarding that input image 652 to one or more other parts of the PGU 600, for example to the holographic gain calculator 604.

The first image processing unit 654 is arranged to form an image frame, which in this example comprises a primary image region and a secondary image region. As already described in detail hereabove, the primary image region may comprise image content that is substantially identical to the image content of the input image 652. The secondary image region may comprise a control region and may comprise a relatively small light spot or square that the first image processing unit 654 is arranged to add to the primary image region, for example at a location that is physically distinct from the primary image region, within the generated image frame. The first image processing unit 654 may be arranged to transmit information regarding the generated image frame to the holographic gain calculator 604. For example, it may transmit information regarding the ratio of the number of light pixels within the primary image region to the number of light pixels within the secondary image region in order to assist the holographic gain calculator 604 in calculating a multiplication factor (or 'holographic gain') that is to be added to the secondary image region.

It will be appreciated from the foregoing description that it will not be appropriate in all cases to apply a multiplication factor to the secondary image region. The holographic gain calculator 604 may be arranged to follow one or more predetermined rules in order to determine when it is appropriate to calculate a holographic gain for a given image and what magnitude that holographic gain should have. Again, as has already been described in detail herein, the one or more predetermined rules may relate to the operating characteristics and/or capabilities of the one or more light sensors that is/are arranged to detect light in a holographically reconstructed image that is generated by the PGU 600. For example, the holographic gain calculator 604 may be arranged to ensure that the luminance of a region of the holographically reconstructed image that is to be sensed by the one or more light sensors has a magnitude that lies within a predetermined range, or above or below a predetermined threshold, wherein that range or threshold corresponds to a range or threshold at which the light sensor or sensors can provide accurate and reliable light detection signals.

The holographic gain calculator 604 is arranged to provide a holographic gain that has been calculated for a given image to a gain factor applicator 656. The first image processing unit 654 is also arranged to provide the image frame to the gain factor applicator 656 which, in turn, will apply any calculated holographic gain to an area of the image frame for which it has been calculated, for example to the secondary image region mentioned above. The gain factor applicator 656 is further arranged to output the image frame, with the holographic gain factor applied thereto, to a second image processing unit 658. The second image processing unit 658 is arranged to generate a hologram from the image frame with the holographic gain applied thereto. The hologram 660 is output by the second image processing unit 658 and displayed on the LCOS 662. The laser light source (not shown) is controlled by the laser current controller 610 to illuminate the LCOS 662 with the hologram 660 displayed thereon, in order to form a holographic reconstruction of the input image 652 at a holographic replay plane, for example on a light receiving surface (not shown) located at the holographic replay plane. One or more portions of that holographic reconstruction can then be detected by the one or more light sensors. Any light detecting detection signals from those light sensors may be fed back as part of the ADC measurements including gains 612 to the luminance feedback loop logic 606.

The luminance feedback loop logic 606 is arranged to use the information comprised within the ADC measurements including gains 612 to determine the luminance of the holographically reconstructed image at a given time and to make any necessary adjustments to the laser control, in order to control the brightness of the image and to thereby more closely match the luminance of the image to the luminance aim 602. As part of this, the luminance feedback loop logic 606 is arranged to take into account any holographic gain factor that was introduced into an image frame before the corresponding hologram was generated and illuminated. The luminance feedback loop logic 606 is further arranged to scale any measurements obtained from the light sensor or sensors in accordance with any known holographic gain factor that was applied to the region of the holographic construction, to which the detection applies. For example, if it knows that a gain factor of '0.5' was applied to a secondary image region before hologram generation and illumination, it can then apply an inverse scaling factor of '2' to the detected light signals in order to obtain a true measure of what the luminance of the secondary image region would have been, in the absence of the holographic gain factor being applied. It may thus determine the luminance of the corresponding primary image region, based on that 'true' luminance information for the secondary image region, in addition to any relevant information from the image processor regarding the spatial relationships (e.g. relative size and/or the ratio of the number of pixels) between the primary and secondary image regions.

The holographic gain that has been applied to an image frame must be considered, by the luminance feedback loop logic 606, only when the holographic reconstruction of that particular image frame is displayed and detected. This is because each image frame may have a different holographic gain applied thereto, and the correct gain factor must be taken into consideration when determining how the luminance of the image should be controlled, for that frame. Hence, a synchronisation between the luminance feedback loop logic 606 and the image processor is needed. In FIG. 6, the synchronisation 664 is shown as being between the LCOS 662 and the DAC 608. However it will be appreciated that any suitable synchronisation may be provided, to ensure that luminance (and any other operating parameters) is controlled by taking into account the correct, relevant light detection signals, including any holographic gain factors that were applied, before generation of the hologram for the detected image.

There may be other inputs into one or more of the components of the PGU 600. Moreover, there may be additional factors that are considered, when calculating a holographic gain to be added to (part of) an image before the corresponding hologram is generated, in addition to or instead of considering the light sensor measurements and luminance factors described in detail hereabove.

Although the specific examples described above have mainly discussed an image frame having a primary image region and a secondary image region, the method disclosed herein is not restricted to such an image frame. The improved methods and corresponding systems can in fact be used to control the luminance of any pixels of a holographic reconstruction, relative to one or more other pixels. The respective luminances of a plurality of pixels, or regions, or image parts, within a holographic reconstruction may controlled separately to one another, with their luminances being changed relative to one or more refence pixels, or reference areas within the holographic reconstruction.

The methods described herein can be used independently or may be used in combination with one or more other approaches for controlling luminance in a holographic projection system. For example, the application of a multiplication factor, or 'holographic gain', as described herein may be carried out in combination with one or more known methods that use different hardware gains (achieved with different resistors) to amplify and control the outputs of a photodiode (i.e. a light sensor) and its dynamic operating range. At low light level, a high hardware gain can be used; at high light level, a small hardware gain can be used. Nonetheless, the present inventors have recognised that the dynamic range that is typically offered by applying hardware gains alone to the operation of a photodiode may not be sufficient to provide a reliable, accurate range of operation, for all applications. For example, when a holographic projection system is comprised in an automotive environment, hardware gains alone are unlikely to be sufficient to enable the photodiode(s) to cover the entire required dynamic range of the heads up display HUD (typically 5000:1). The presently described methods, on the other hand, can apply any appropriate scaling factor to an image, before the corresponding hologram is generated, and therefore can enable any magnitude of 'true' luminance to be scaled in order to be accurately detectable by any photodiode, regardless of its operational constraints.

The present methods can be applied on a dynamic basis. For example, a method of calculating a holographic gain, and/or of controlling luminance in accordance with a luminance aim and/or in accordance with operational capabilities of one or more light sensors, can be repeated for multiple successive image frames that are to be holographically reconstructed. Moreover, the present methods can be performed more than once, for a single image frame. For example, if it is determined that an existing scaling factor on a secondary image region has led to the luminance of the corresponding secondary region of the holographically reconstructed image being within a non-optimal range for the corresponding light sensor(s), the scaling factor can be modified, and a new hologram generated and illuminated, to produce a more favourable luminance level for the secondary region of the holographically reconstructed image. Thus, the present methods may provide luminance control very quickly, as is often required in holographic systems, and may provide a combination of proactive and reactive luminance control.

The present methods enable different multiplications factors to be set, for different respective image frames or even for different respective parts of a single image frame, without impacting the hardware of the holographic projection system. They also enable the luminance (or brightness or optical power) of at least a portion of a holographically reconstructed image to be tuned in accordance with feedback received from the light sensor(s). In practice, the holographic gain can be very rapidly changed, and the luminance of a display holographic reconstruction can be very rapidly adjusted, for each image frame, so that the viewer does not perceive any brightness changes when viewing a holographic reconstruction, because the present methods establish the right gain and the right laser current so quickly.

The present methods effectively increase the operational capabilities—which may be referred to as the 'dynamic range'—of one or more photodiodes (or, light sensors), for light detection in a holographic projection system. Low light levels and high light levels can be sensed by the photodiode(s), independently from any hardware gains, and in fact there is no need for hardware gains to be applied, when the present methods are used. The present methods do not add complexity, bulk, or cost to the hardware for a holographic projection system. Moreover, the computations involved are not unduly burdensome for a controller or processor that would typically be comprised within, or used in conjunction with, a holographic projection system for controlling other, known methods.

Although the description above relates to the detection of luminance, in practice a different optical parameter may be detected, measured and transmitted as part of a light detection signal. For example, a light sensor may be configured to detect optical power. It is known how to convert a radiant/optical power (Js-1) or radiant intensity (Js-1sr-1) measurement from a light detector into luminance. Any of the control components within the PGU 600, or any other suitable controller, may be arranged to perform such a conversion a=for the purpose of the methods described herein.

It is known from GB2554472 that a so-called 'gain factor, G' may be applied to a detected light signal from a photodiode, in order to change the current (or, power) of the light source in a holographic projection system, in order to achieve a target luminance for the primary part of a holographically reconstructed image. The gain factor, G, is applied to the drive input of the light source and the optical power of the primary image region is changed by changing the gain factor. That gain factor may be determined by the equation:

$$G = \frac{T}{P \times \frac{x}{y}} \quad (1)$$

wherein T=the desired maximum luminance (cd/m$^2$) of the image, P=the luminance (cd/m$^2$) at the first wavelength of the secondary image region (obtained, for example, by dividing the detected optical power by the area of the secondary image region and scaling to convert from Js$^{-1}$ m$^{-2}$ to cdm$^{-2}$, as is well known), x=the total number of grey levels used in the image and y=the grey level of the light of the secondary image region.

The gain factor G may be applied to the drive input of the light source in a holographic projection system, in which the 'holographic gain' described herein is also applied to an image frame. It will be appreciated that the holographic gain described herein is applied to an input image, for example to the secondary image region within an image frame comprising the input image, before generation of the hologram. It should not be confused with the above gain factor, G, which can be applied to the drive input of the light source as a way of controlling the power/current to the laser on a dynamic basis, in order to achieve a target luminance for the primary region of the holographically reconstructed image.

Luminance Prediction

As mentioned above, the present inventors have also determined a method for predicting luminance for a holographic reconstruction. This can enable an appropriate holographic gain to be determined for an image, based on the predicted luminance, before a hologram is generated for the image.

It is known that, in holographic displays, for a given laser light power, the luminance (cdm$^{-2}$) of the displayed holographic image (with red, green and blue (RGB) being considered separately) depends on:

The number of illuminated pixels (RGB being considered separately) in the image; and The grey (i.e. greyscale) value of the pixels (RGB being considered separately) in the image.

This dependency exists for a holographic image as a whole and also for a part of a holographic image—such as the primary region, comprising the image content, which is separate to a secondary 'control' region, comprising no-image content, in the examples described hereabove.

Both the number of illuminated pixels (RGB being considered separately) that will be comprised in the holographically reconstructed image, and the greyscale of the pixels (again, RGB being considered separately) can be determined as part of an image processing step, before the image is converted into a hologram.

The luminance dependency may be captured using a single physical value: the pixel usage (RGB), which is defined as the sum of all grey values of the pixels (RGB) divided by the maximal number of pixels in the image. This present inventors have determined that this pixel usage may be defined for each colour component separately, as follows:

$$PixelUsage_{R,G,B} = \frac{\sum_{all\ pixels_{R,G,B}} Grey\ values}{Total\ number\ of\ pixels} \quad (2)$$

Thus, each holographically reconstructed image (or holographically reconstructed image part) has a specific pixel usage. For a given laser light power, this means that each image would have a different luminance. However, typically a holographic projection system will be arranged to have a luminance aim (i.e. a target luminance) that is the same for multiple successive image frames. As already described above, the laser light power in the holographic projection system may therefore have to be adjusted, frame by frame, to achieve such a luminance aim.

Traditional holographic displays, such as the one shown in FIG. 4b herein, must have a fast luminance feedback loop, arranged to sense the luminance variation of a succession of images, due to a content change (image frame change) and correct for it, without a viewer perceiving a momentary change in luminance within a succession of images. This correction must happen faster than the image refresh rate, which may typically be faster than 60 Hz. Such a fast and continuous luminance control can increase the complexity of the required hardware for a holographic projection system.

However, the present inventors have recognised that the luminance variation due to a content change (image change) can be predicted and can be compensated for substantially synchronously with a new image being displayed. Therefore, the need for extremely fast luminance feedback loop logic is removed or at least alleviated.

The present inventors have identified that pixel usage for an input image can be calculated in real time in a holographic projection system—such as the PGU 600 shown in FIG. 6 herein—as part of the image processing, before the image is converted into a hologram and holographically reconstructed.

The pixel usage can be calculated, for a given input image (that will be processed to form an upcoming holographically reconstructed image), using equation (2), above, by any suitable controller or processor. The calculated pixel usage can then be provided as an input to the image processor, along with the input image itself, before the image processor generates a hologram corresponding to the input image. The calculated pixel usage of each image frame can also be sent to the luminance control aspects of the holographic projection system. The calculated pixel usage may therefore be used to determine what the luminance of the upcoming holographically reconstructed image would be, at the present laser operating current—and, indeed, what the laser operating current would need to be changed to, in order for the predicted pixel usage to give rise to a target luminance for the upcoming holographically reconstructed image.

For example, a required change of laser current, which will be needed to compensate for the image content change that will happen when the upcoming holographically reconstructed image is displayed, can be calculated based on a comparison of the pixel usage (and corresponding laser current) of a preceding image frame and the predicted pixel usage of the upcoming image frame. As with the PGU 600 in FIG. 6, the change of laser current for this method should, at least in some arrangements, only be applied when the upcoming image frame is actually displayed on the LCOS. Hence, a synchronisation signal may be provided between the LCOS device and the luminance feedback logic.

The holographic gain that may have to be applied to a secondary region of an image may be calculated, based on a predicted luminance, as described above. That is; when a predicted pixel usage is calculated for an upcoming image frame and a corresponding change in laser current is determined, to meet a requirement such as a target luminance, the system can review what the luminance of the secondary region would be, with that laser current applied, and whether it is appropriate to apply a holographic gain (i.e. to apply a scaling factor) thereto, in order to provide a luminance (or a brightness or an optical power) of the secondary region that is within an acceptable range for the corresponding light sensor(s).

The luminance prediction described herein may remove a need for a luminance feedback loop to actually measure a change in luminance, due to an image content change, and to subsequently apply a correction while the image is displayed. Instead, the correction can be anticipated and made at the same time as a new image, for which the correction was calculated, is displayed. Alternatively, the luminance prediction described herein may be used in conjunction with making one or more measurements, as part of a feedback loop. For example, a luminance prediction may be applied in order to set initial parameters—for example, to determine an initial gain factor, to be applied to a part of an upcoming hologram—and one or more measurements, obtained by one or more sensors and input to a feedback control loop, may be used to fine tune those parameters, if required.

The luminance prediction also reduces the number of iterations of a luminance feedback loop (and the number of photodiodes measurements) that are needed for a holographic projection system to reach a luminance target, for each new image frame. Hence, each image reaches the luminance desired by the viewer more quickly, without noticeable delay. Moreover, because fewer photodiode measurements are needed for luminance feedback, any remaining available photodiode measurements may be used for other purposes. For instance, they may be used to control and/or correct the image alignment and/or image position of a holographically reconstructed image.

Accordingly, a method is provided of holographic projection, the method comprising:
receiving an image for projection;
determining a number of pixels in the image;
determining a grey level for each of the pixels in the image;
calculating a predicted pixel usage, for a holographic reconstruction of a hologram that is to be created to represent the received image, using the determined number of pixels and their respective grey levels;
using the predicted pixel usage to determine a value of a parameter representative of optical power of a light source, arranged to illuminate the hologram that is to be created, wherein that value would be required in order to meet a target luminance, for the holographic reconstruction.

The method may further comprise calculating a hologram of the image.

The method may comprise forming an image frame comprising a first image region and second image region, wherein the first image region corresponds to the image and the second image region corresponds to non-image content representative of a system control parameter. The method may further comprise calculating a hologram of the image frame.

The target luminance may apply only to part of the holographic reconstruction. For example, it may apply only to a primary region that corresponds to a first image region of an image frame, wherein the image content of that first image region corresponds to the image content of the received image. A secondary region of the holographic reconstruction, which corresponds to the secondary image region of the image frame, may not have a target luminance or may have a different target luminance to the primary region.

The method may comprise using the determined value of the parameter representative of optical power of the light source to predict a luminance of a part of the holographic reconstruction that would result if a hologram of the image, or of the image frame, was illuminated by the light source, operating at the determined optical power. For example, the predicted luminance may be of a secondary region of the holographic reconstruction, to which the target luminance does not apply.

The method may comprise determining a gain factor to apply to a part of the image or image frame, to change one or more grey level(s) of that part of the image (frame), using the predicted luminance for a corresponding part of the holographic reconstruction. For example, the gain factor may be determined for a part of the holographic reconstruction to which to which the target luminance does not apply. The gain factor may be determined before a hologram of the image or image frame is calculated. In some cases, a first hologram may be generated of an unmodified image frame and a second hologram may be made of a modified version of the image frame, to which the gain factor has been applied, as part of a control feedback loop.

The method may comprise determining a present value of the parameter representative of optical power of the light source, arranged to illuminate the hologram, and further determining a modification that should be made, to the value of the parameter, in order to meet the target luminance for a holographic reconstruction of an image. This may be done as part of a control feedback loop for a holographic projection system.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the light sensor, or detector, is a photodetector such as a photodiode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent No. 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A method of holographic projection, the method comprising:
    (i) receiving an image for projection and determining a pixel usage of the image;
    (ii) forming an image frame comprising a first image region and second image region, wherein the first image region corresponds to the image and the second image region corresponds to non-image content representative of a system control parameter;
    (iii) applying a first gain factor to the non-image content in order to change a grey level of the non-image content of the image frame, wherein the first gain factor is determined based on the pixel usage, and wherein the first gain factor is proportional to the pixel usage;
    (iv) calculating a hologram of the image frame;
    (v) displaying the hologram and illuminating the hologram with light from a light source to form a holographic reconstruction of the image frame;
    (vi) measuring a parameter representative of the luminance of the holographic reconstruction of the non-image content;
    (vii) scaling the measured parameter in accordance with an inverse of the first gain factor, to obtain a parameter value that is representative of a true luminance of the holographic reconstruction of the non-image content; and
    (viii) controlling the optical power of the light illuminating the hologram until the true luminance of the holographic reconstruction of the non-image content indicates that a target luminance is met, for the holographic reconstruction of the image content of the image frame.

2. The method as claimed in claim 1 further comprising, calculating a parameter value that is representative of a luminance of the holographic reconstruction of the image content of the image frame, using the parameter value that is representative of the true luminance of the holographic reconstruction of the non-image content.

3. The method as claimed in claim 1 further comprising receiving further images for projection one at a time and performing steps (i) to (viii) for each received image in order that the luminance of the holographic projection of each image is substantially the same.

4. The method as claimed in claim 1 wherein step (vi) further comprises changing the first gain factor in response to the measured parameter representative of luminance and repeating steps (iii) to (vi) before progressing to step (vii).

5. The method as claimed in claim 4 wherein the first gain factor is increased if the measured parameter representative of luminance is above a first threshold level or decreased if the measured parameter representative of luminance is below a second threshold level, wherein the first threshold level is associated with saturation of a photodetector measuring the luminance and the second threshold level is associated with a noise level of the photodetector.

6. The method as claimed in claim 1 wherein step (iii) further comprising determining the first gain factor based on the target luminance, optionally, wherein the first gain factor is inversely proportional to the target luminance.

7. The method as claimed in claim 1 wherein the pixel usage is equal to the sum of the all the grey level values of the image divided by the total number of pixels of the region.

8. The method as claimed in claim 1 wherein measuring the luminance is performed using a photodetector and amplifier circuit, wherein the method further comprises the amplifier circuit applying a second gain factor to the electrical signal generated by the photodiode in response to received light of the second image region and step (vii) comprises scaling the luminance in accordance with the first and second gain factor.

9. The method of claim 1, wherein said method is a computer-implemented method.

10. A non-transitory computer readable medium having stored thereon computer program instructions executable by a processor of a device to carry out the method according to claim 1.

11. A holographic projection system comprising:
    a spatial light modulator (SLM) arranged to display a diffractive pattern comprising a hologram;
    a light source arranged to illuminate the diffractive pattern in order to form a holographic reconstruction of the structured light pattern;
    a light detector arranged to detect light from the holographic reconstruction and to output a respective detected light signal;
    an image processor arranged to receive an image for projection, determine a pixel usage of the image, and to form an image frame comprising a first image region and second image region, wherein the first image region corresponds to the image and the second image region corresponds to non-image content representative of a system control parameter;
    the image processor being further arranged to determine a first gain factor based on the pixel usage, apply the first gain factor to the non-image content in order to change a grey level of the non-image content of the image frame, and to calculate a hologram of the image frame, wherein the first gain factor is proportional to the pixel usage;

the system further comprising:

a controller arranged to receive the respective detected light signal from the light detector and to obtain a measure of a parameter representative of the luminance of the holographic reconstruction of the non-image content, from said detected light signal;

the controller being further arranged to:

scale the measured parameter in accordance with an inverse of the first gain factor, to obtain a parameter value that is representative of true luminance of the holographic reconstruction of the non-image content; and control the optical power of the light source, illuminating the hologram, until the true luminance of the holographic reconstruction of the non-image content indicates that a target luminance is met, for the holographic reconstruction of the image content of the image frame.

12. The system of claim 11 wherein the controller is further arranged to calculate a parameter value that is representative of an image luminance, of the holographic reconstruction of the image content, using the parameter value that is representative of the true luminance of the holographic reconstruction of the non-image content.

13. The system of claim 12 wherein the spatial light modulator (SLM) is arranged to provide a synchronisation signal to the controller.

14. The system of claim 12 wherein the image processor and/or the controller is/are arranged to carry out the method of claim 1.

15. A method of holographic projection, comprising:
(i) receiving an image for projection;
(ii) determining a number of pixels in the image;
(iii) determining a grey level for each of the pixels in the image;
(iv) calculating a predicted pixel usage, for a holographic reconstruction of a hologram that is to be created to represent the received image, using the determined number of pixels and their respective grey levels;
(v) using the predicted pixel usage to determine a value of a parameter representative of optical power of a light source, arranged to illuminate the hologram that is to be created, wherein that value would be required in order to meet a target luminance, for the holographic reconstruction.

16. The method of claim 15, further comprising calculating a hologram of the received image.

17. The method of claim 15, further comprising using the determined value of the parameter representative of optical power of the light source to predict a luminance of at least a part of the holographic reconstruction, which would result if a hologram of the image was illuminated by the light source, operating at said optical power.

18. The method of claim 15, further comprising determining a modification that should be made, to the value of the parameter representative of optical power of the light source, in order to meet the target luminance for the holographic reconstruction of the image.

* * * * *